(12) United States Patent
Morgan et al.

(10) Patent No.: US 7,092,937 B2
(45) Date of Patent: Aug. 15, 2006

(54) VEHICLE DIAGNOSTIC KNOWLEDGE DELIVERY

(75) Inventors: Alexander P. Morgan, Birmingham, MI (US); Lawrence M. Quinn, Macomb, MI (US); Gulcin Sengir, Bloomfield Hills, MI (US); Diane I. Gibbons, Troy, MI (US); Michael A. Sowa, Clinton Township, MI (US); Stephen L. Falko, Southfield, MI (US); Frederick J. Vondrak, Livonia, MI (US); Thorsten W. Rommel, Mainz (DE)

(73) Assignee: General Motors Corporation, Detroit, MI (US)

( * ) Notice: Subject to any disclaimer, the term of this patent is extended or adjusted under 35 U.S.C. 154(b) by 431 days.

(21) Appl. No.: 10/408,761

(22) Filed: Apr. 7, 2003

(65) Prior Publication Data

US 2004/0199542 A1    Oct. 7, 2004

(51) Int. Cl.
*G06F 17/30* (2006.01)

(52) U.S. Cl. .................. 707/3; 707/2; 707/4; 707/5; 707/104.1

(58) Field of Classification Search ............ 707/104.1, 707/100, 2, 3, 4, 5; 701/1, 35, 33, 29, 30, 701/31, 32, 34; 705/4; 340/10.42, 539.24, 340/901; 702/187, 188, 183
See application file for complete search history.

(56) References Cited

U.S. PATENT DOCUMENTS

| | | | |
|---|---|---|---|
| 5,541,840 A * | 7/1996 | Gurne et al. .............. 701/33 |
| 5,542,024 A * | 7/1996 | Balint et al. ............. 715/853 |
| 5,546,507 A * | 8/1996 | Staub ....................... 706/60 |
| 5,799,148 A | 8/1998 | Cuddihy et al. ....... 395/183.92 |
| 5,839,112 A * | 11/1998 | Schreitmueller et al. ...... 705/4 |
| 5,844,987 A * | 12/1998 | Matthews et al. .......... 340/901 |
| 5,918,240 A * | 6/1999 | Kupiec et al. ............ 715/531 |
| 6,052,065 A * | 4/2000 | Glover .................. 340/10.42 |
| 6,070,164 A * | 5/2000 | Vagnozzi ................. 707/100 |
| 6,076,026 A * | 6/2000 | Jambhekar et al. ......... 701/35 |
| 6,205,456 B1 * | 3/2001 | Nakao ..................... 715/531 |
| 6,243,628 B1 | 6/2001 | Bliley et al. ............... 701/29 |
| 6,256,627 B1 | 7/2001 | Beattie et al. .............. 707/6 |
| 6,374,261 B1 * | 4/2002 | Alvarez et al. ........... 707/200 |
| 6,389,337 B1 * | 5/2002 | Kolls ....................... 701/29 |
| 6,405,162 B1 * | 6/2002 | Segond et al. .............. 704/9 |
| 6,415,395 B1 | 7/2002 | Varma et al. .............. 714/37 |
| 6,449,539 B1 * | 9/2002 | Ohno et al. ................ 701/31 |

(Continued)

FOREIGN PATENT DOCUMENTS

WO    WO 01/30632    5/2001

(Continued)

OTHER PUBLICATIONS

Weiss, Sholom M.; Indurkhya, Nitin; Predictive Data Mining A Practical Guide, pp. 5.

(Continued)

*Primary Examiner*—Frantz Coby
(74) *Attorney, Agent, or Firm*—Kathryn A. Marra

(57) ABSTRACT

A method for vehicle diagnostic knowledge delivery comprising receiving a search request from a user system and accessing a database of case records in response to the search request. Each of the case records includes a case-record number attribute, a set of vehicle-description attributes, a set of bookkeeping attributes, a set of system attributes, a set of symptom attributes, and a set of action attributes. The method further comprises searching the database of case records for a case record responsive to the search request. If a case record responsive to the search request is located, it is transmitted to the user system.

34 Claims, 4 Drawing Sheets

U.S. PATENT DOCUMENTS

| | | |
|---|---|---|
| 6,694,235 B1 * | 2/2004 | Akiyama ..................... 701/33 |
| 6,754,564 B1 * | 6/2004 | Newport ....................... 701/1 |
| 6,768,935 B1 * | 7/2004 | Morgan et al. ............... 701/29 |
| 6,836,708 B1 * | 12/2004 | Tripathi ....................... 701/29 |
| 6,847,872 B1 * | 1/2005 | Bodin et al. .................. 701/33 |
| 6,925,368 B1 * | 8/2005 | Funkhouser et al. .......... 701/33 |
| 6,933,842 B1 * | 8/2005 | Oesterling et al. ..... 340/539.24 |
| 2004/0264650 A1 * | 12/2004 | Wright et al. .............. 379/9.04 |

FOREIGN PATENT DOCUMENTS

| | | |
|---|---|---|
| WO | WO 01/31411 | 5/2001 |
| WO | WO 01/98631 | 12/2001 |

OTHER PUBLICATIONS

Bergmann, Ralph, Breen, Sean; Goker, Mehmet; Manago, Michel; Wess, Stefan; Developing Industrial Case-Based Resoning Applications, The INRECA methodology, pp. 5.

Kolodner, Janet; Case-Based Reasoning, pp. 5.

2nd Workshop on Innovative Customer-Centered Applications (ICCA-2001), Jul. 30, 2001 Vancouver, Canada, pp. 5.

\* cited by examiner

310 — STRUCTURED-RECORD NUMBER
320 — VEHICLE DESCRIPTION
    VIN
    VEH YR
    VEH LINE
    VIN MODEL
    VIN MAKE
    VIN SERIES
    VIN BODY
    VIN ENGINE
    VIN YR
    VIN PLANT
    VIN SERIAL
    MILEAGE
330 — BOOKKEEPING
    DATE AUTHORED
    DATE EDITED
    AUTHOR/EDITOR
    BULLETINS
    RECORD NUMBER
    STRUCTURED-RECORD STATUS
    RELEASE AUTHORIZER
    LANGUAGE
340 — SYSTEM
    SERVICE CATEGORY TYPE
    SERVICE CATEGORY
    SERVICE SUB-CATEGORY
350 — SYMPTOM
    MAIN SYMPTOM GROUP
    SYMPTOM
    SYMPTOM DETAIL
    FUNCTIONAL COMPONENT/SYSTEM
    FUNCTIONAL COMPONENT/SYSTEM DETAIL
    FREQUENCY
    ENVIRONMENT CONDITION
    VEHICLE CONDITION
    VEHICLE ZONE
    DTC
    DTC QUALIFIER
    ADDITIONAL SYMPTOM COMMENTS
360 — ACTION
    ACTION TAKEN
    COMPONENT NAME
    COMPONENT LOCATION
    COMPONENT PIECE OF
    COMPONENT DETAIL
    LABOR OPS
    ADDITIONAL ACTION COMMENTS

*FIG. 3*

410 — CASE-RECORD NUMBER
420 — VEHICLE DESCRIPTION
- VIN
- VEH YR
- VEH LINE
- VIN MODEL
- VIN MAKE
- VIN SERIES
- VIN BODY
- VIN ENGINE
- VIN YR
- VIN PLANT
- VIN SERIAL
- MILEAGE

430 — BOOKKEEPING
- DATE AUTHORED
- DATE EDITED
- AUTHOR/EDITOR
- BULLETINS
- RECORD NUMBER
- CASE-RECORD STATUS
- RELEASE AUTHORIZER
- LANGUAGE
- STRUCTURED-RECORD NUMBER
- NUMBER OF STRUCTURED RECORDS

440 — SYSTEM
- SERVICE CATEGORY TYPE
- SERVICE CATEGORY
- SERVICE SUB-CATEGORY

450 — SYMPTOM
- MAIN SYMPTOM GROUP
- SYMPTOM
- SYMPTOM DETAIL
- FUNCTIONAL COMPONENT/SYSTEM
- FUNCTIONAL COMPONENT/SYSTEM DETAIL
- FREQUENCY
- ENVIRONMENT CONDITION
- VEHICLE CONDITION
- VEHICLE ZONE
- DTC
- DTC QUALIFIER
- ADDITIONAL SYMPTOM COMMENTS

460 — ACTION
- ACTION TAKEN
- COMPONENT NAME
- COMPONENT LOCATION
- COMPONENT PIECE OF
- COMPONENT DETAIL
- LABOR OPS
- ADDITIONAL ACTION COMMENTS

470 — FEEDBACK
- CASE USEFUL COUNTER
- CASE NOT USEFUL COUNTER
- CASE CORRECT COUNTER
- CASE NOT CORRECT COUNTER
- CASE USEFUL AND CORRECT COUNTER
- NUMBER OF TIMES CASE VIEWED COUNTER
- FEEDBACK TEXT

480 — CASE SUMMARY
- TITLE
- CASE SUMMARY
- FINAL COMMENTS

490 — OTHER DOCUMENTATION

*FIG. 4*

VEHICLE DIAGNOSTIC KNOWLEDGE DELIVERY

BACKGROUND OF THE INVENTION

The present disclosure relates generally to vehicle diagnostic knowledge delivery and in particular, to a method of verifying the content of vehicle repair case records and delivering them to vehicle technicians for assistance in vehicle diagnostics and repair.

The conventional diagnosis and repair process for most vehicles is based on the experience of individual service technicians. The knowledge of a service technician may be supplemented with paper-based information, such as service manuals, describing the structure and operation of the vehicle. Each automotive repair shop may have one or more expert service technicians that assist the less skilled or less experienced service technicians in performing diagnosis and repair procedures. Typically, the scope of diagnosis and repair performed by a single automotive repair shop is limited. Therefore, the amount of knowledge acquired by the expert technicians located at each automotive repair shop may be limited to the specific repairs that have been performed at the automotive repair shop in the past. This may affect the ability of a particular automotive repair shop to diagnose and repair a vehicle in an expeditious manner if they have not previously performed the particular diagnosis and repair.

Many automotive repair shops, including car dealerships and independent repair shops, have some form of access to a central computer for repair advice and assistance. These systems typically include information that is created by engineers who have designed and manufactured the vehicle (e.g., service manuals). These systems may be useful in diagnosing and repairing a vehicle but may contain so much information that in some cases it may become cumbersome for the service technician to utilize them for simple repairs. In addition, the information may not be updated based on field experience with both the diagnosis and repair procedures.

In one survey, service technicians were asked to rank sources of service information in terms of usefulness during the diagnostic and repair process. The result was the following list, in rank order beginning with the most useful:

1. Technician's own experience;
2. Experience of other technicians;
3. Service Manuals, Bulletins;
4. Preliminary Bulletins;
5. Technical Assistance Center (TAC) hot line (many respondents complained that TAC calls take too much time); and
6. Service Manager/ Shop Foreman.

Currently, these various information sources are not integrated. In addition, these information sources are not always accessible to service technicians in the time frame or format required.

BRIEF DESCRIPTION OF THE INVENTION

One aspect of the present invention is a method for vehicle diagnostic knowledge delivery. The method comprises receiving a search request from a user system and accessing a database of case records in response to the search request. Each of the case records includes a case-record number attribute, a set of vehicle-description attributes, a set of bookkeeping attributes, a set of system attributes, a set of symptom attributes and a set of action attributes. The method further comprises searching the database of case records for a case record responsive to the search request. If a case record responsive to the search request is located, it is transmitted to the user system.

In another aspect, a system for vehicle diagnostic knowledge delivery comprises a network and a storage device in communication with the network. The system also includes a host system in communication with the network and including application software to implement a method. The method comprises receiving a search request from a user system and accessing a database of case records located on the storage device in response to the search request. Each of the case records includes a case-record number attribute, a set of vehicle-description attributes, a set of bookkeeping attributes, a set of system attributes, a set of symptom attributes and a set of action attributes. The method further comprises searching the database of case records for a case record responsive to the search request. If a case record responsive to the search request is located, it is transmitted to the user system.

In a further aspect, a computer program product for vehicle diagnostic knowledge delivery comprises a storage medium readable by a processing circuit and storing instructions for execution by the processing circuit for performing a method. The method comprises receiving a search request from a user system and accessing a database of case records in response to the search request. Each of the case records includes a case-record number attribute, a set of vehicle-description attributes, a set of bookkeeping attributes, a set of system attributes, a set of symptom attributes and a set of action attributes. The method further comprises searching the database of case records for a case record responsive to the search request. If a case record responsive to the search request is located, it is transmitted to the user system.

A further aspect is a case-record format for vehicle diagnostic knowledge delivery. The format comprises a case-record number attribute, a set of vehicle-description attributes, a set of bookkeeping attributes, a set of system attributes, a set of symptom attributes and a set of action attributes.

BRIEF DESCRIPTION OF THE DRAWINGS

Referring to the exemplary drawings wherein like elements are numbered alike in the several FIGURES:

FIG. 3 is an exemplary structured vehicle diagnostic record format; and

FIG. 4 is an exemplary case record format.

DETAILED DESCRIPTION OF THE INVENTION

A method of vehicle diagnostic knowledge delivery is presented to assist service technicians in the area of vehicle fault diagnosis, by drawing on the experience of other technicians who have seen and solved similar repair issues in the past. Utilizing an exemplary embodiment of the present invention, the vehicle diagnostic knowledge is delivered to service technicians in the form of solved repair issues and diagnostics, or cases, in a case database. The structure of the case records contained in the case database captures the important features, or attributes, of the service-diagnostic process. In addition, the data contained in the case records is sourced from service records created by vehicle service technicians. The service technicians may access the case records in the case database by initiating search requests from a user system. For example, a technician may search for a particular symptom or for a combination of a particular symptom and vehicle model. In addition to the delivery process, an exemplary embodiment of the present invention also includes a release process, a feedback process and a maintenance process. The release process takes structured vehicle diagnostic records as input, validates structured vehicle diagnostic records for inclusion in the case database and creates case records out of validated structured records. The feedback process allows a user (e.g., a service technician) to provide feedback on the usefulness and/or accuracy of the information contained in the case records. This feedback may then be incorporated into the system through updates to the case database. Finally, the maintenance process performs maintenance functions such as: granting user access, assigning and implementing user rights (what functionality is available to whom), enabling modifications to the case structure (e.g., adding attributes), and importing data elements into the system.

Figure 1:
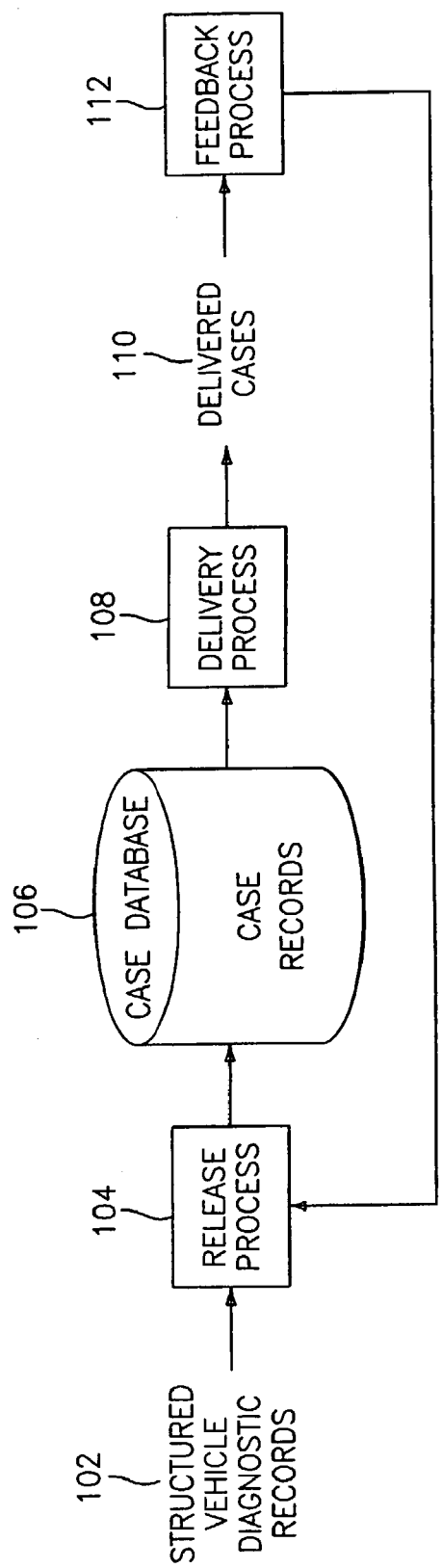
FIG. 1 is a block diagram of an exemplary vehicle diagnostic knowledge delivery process.

FIG. 1 is a block diagram of a vehicle diagnostic knowledge delivery process that may be implemented utilizing an embodiment of the present invention. In an exemplary embodiment of the present invention, the vehicle is an automobile. Structured vehicle diagnostic records 102 are input into the release process 104. Structured vehicle diagnostic records 102 are created from actual vehicle repair records as documented by vehicle technicians, from the Technical Assistance Center (TAC), and from other sources. The attributes included in an exemplary structured vehicle diagnostic record 102 are described below in reference to FIG. 3. Because structured vehicle diagnostic records 102 are created from field data they are likely to accurately reflect the actual types of diagnoses and repairs that a technician will encounter with a particular vehicle.

In the release process 104, each structured vehicle diagnostic record 102 is reviewed and, if approved (or validated), released as a case record into the case database 106. In an exemplary embodiment, the case record structure includes most of the attributes contained in the structured vehicle diagnostic record 102 with the addition of several attributes and sets of attributes relating to cases. The attributes included in an exemplary case record that could be stored in the case database 106 are described below in reference to FIG. 4. In an alternate exemplary embodiment, attributes in the case record structure are the same as the attributes in the structured vehicle diagnostic record 102. The review and approval of a structured vehicle diagnostic record 102 may be performed by an expert or specialist in a particular area related to the vehicle. For example, a transmission specialist might read through all transmission-related structured vehicle diagnostic records 102 and decide if the information appears to be reasonable and accurate. If the data contained in the structured vehicle diagnostic record 102 appears to be reasonable, the specialist would approve it and release it for inclusion in the case database 106 as a case record. In an alternate exemplary embodiment, portions or all of the review and approval process are automated. In addition, the release process 104 may include clustering two or more structured vehicle diagnostic records 102 together to form a single case record for release into the case database 106.

The delivery process 108 depicted in FIG. 1, includes providing the vehicle diagnostic knowledge contained in the case database 106 to service technicians. In an exemplary embodiment of the present invention, the service technicians are located at a variety of different automotive repair shops. As part of the delivery process 108, a service technician would transmit a search request to the case database 106. The search request could specify a single value, multiple values or ranges of values for particular case record attributes. In response, a search engine utilized by the delivery process 108 would search the case database 106 for case records that matched the search request or came closest to matching the search request while meeting some threshold similarity value. The case records, or vehicle diagnostic knowledge contained in the case database 106, would then be presented to the service technician in the form of delivered cases 110. The delivery process 108 could also include the use of an expert system to access and analyze the case database 106 for case records satisfying the search request from the service technician.

The feedback process 112 in FIG. 1, allows the service technician to provide feedback on the delivered cases 110. Feedback includes information about the usefulness of the delivered cases 110, the accuracy of the information included in the delivered cases 110 and supplemental information that could be helpful in the delivered cases 110. Feedback could also suggest a new case not similar to any case in the case base. This feedback information is reviewed (e.g., by the same personnel performing the release process 104) and integrated into the case database 106 if approved. The updates to the case database 106 could include actions such as updating a case record and recalling a case record. In this manner, the vehicle diagnostic knowledge contained in the case database 106 may improve over time.

Figure 2:
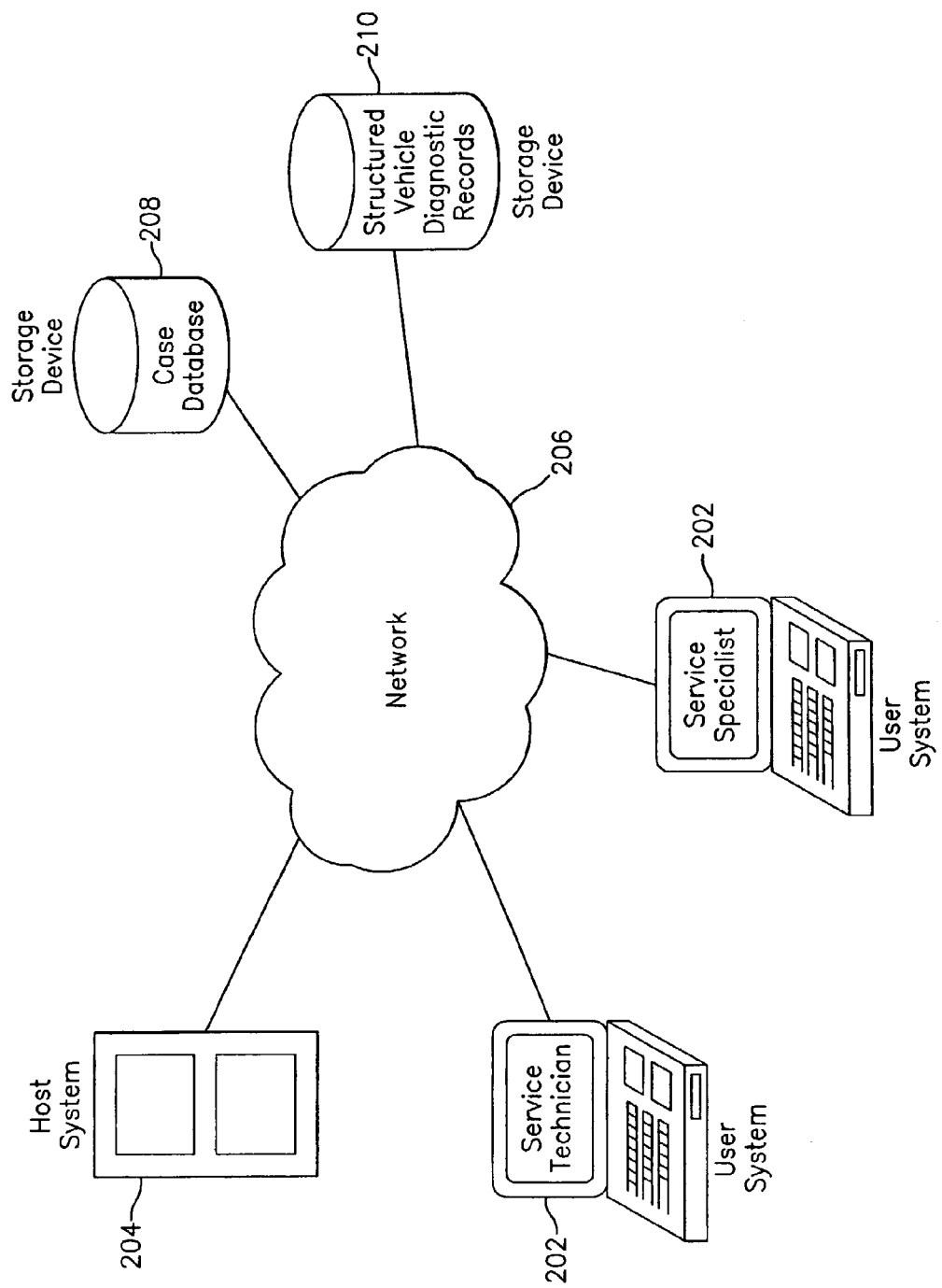
FIG. 2 is a block diagram of an exemplary system for performing vehicle diagnostic knowledge delivery.

In FIG. 2, a block diagram of an exemplary system for performing vehicle diagnostic knowledge delivery is generally shown. The system includes one or more user systems 202 through which users at one or more geographic locations may contact the host system 204 to initiate the execution of the release process 104, the delivery process 108 and the feedback process 112. In an exemplary embodiment, a service technician utilizes a user system 202 located at an automotive repair shop (e.g., a car dealership, an independent repair shop) and a service specialist utilizes a user system 202 located at a central location. In an exemplary embodiment, the host system 204 executes a vehicle diagnostic knowledge delivery application program including instructions to implement the release process 104, the delivery process 108 and the feedback process 112. The user systems 202 are coupled to the host system 204 via a network 206. Each user system 202 may be implemented using a general-purpose computer executing a computer program for carrying out the processes described herein. The user system 202 may be any type of user system known in the art including personal computer, a personal digital assistant and a host attached terminal. If the user system 202 has the capabilities (e.g., a personal computer), the processing described herein may be shared by a user system 202 and the host system 204 (e.g., by providing an applet to the user system 202).

The network 206 may be any type of known network including, but not limited to, a wide area network (WAN), a local area network (LAN), a global network (e.g. Internet), a virtual private network (VPN), and an intranet. The network 206 may be implemented using a wireless network or any kind of physical network implementation known in the art. A user system 202 may be coupled to the host system 204 through multiple networks (e.g., intranet and Internet) so that not all user systems 202 are coupled to the host system 204 through the same network. One or more of the user systems 202 and the host system 204 may be connected to the network 206 in a wireless fashion.

The storage devices 208, 210 may be implemented using a variety of devices for storing electronic information. It is understood that the storage devices 208, 210 may be implemented using memory contained in the host system 204 or they may be separate physical devices. The storage devices 208, 210 are logically addressable as a consolidated data source across a distributed environment that includes a network 206. The physical data may be located in a variety of geographic locations depending on application and access requirements. Information stored in the storage devices 208, 210 may be retrieved and manipulated via the host system 204. The storage device 208 includes the case database 208 and may also include other kinds of data such as information concerning the releasing and storing of case records (e.g., a user identifier, date, and time of release or delivery). The case database may be implemented utilizing any type of database known in the art (e.g., a relational database). In an exemplary embodiment of the present invention, commercial search tools and expert systems associated with the commercial database product being used for the case database 106 are utilized to search and sort the cases records. The storage device 210 includes the structured vehicle diagnostic records. In an alternate embodiment, both storage devices 208,210 are consolidated into a single storage device. In an exemplary embodiment, the host system 204 operates as a database server and coordinates access to application data including data stored on storage device 208, 210.

The host system 204 depicted in FIG. 2 may be implemented using one or more servers operating in response to a computer program stored in a storage medium accessible by the server. The host system 204 may operate as a network server (e.g., a web server) to communicate with the user system 202. The host system 204 handles sending and receiving information to and from the user system 202 and can perform associated tasks. The host system 204 may also include a firewall to prevent unauthorized access to the host system 204 and enforce any limitations on authorized access. For instance, an administrator may have access to the entire system and have authority to modify portions of the system. A firewall may be implemented using conventional hardware and/or software as is known in the art.

The host system 204 may also operate as an application server. The host system 204 executes one or more computer programs to perform vehicle diagnostic knowledge delivery functions. These functions include the release process, the delivery process and the feedback process discussed previously. In an exemplary embodiment of the present invention, commercially available search, update and presentation tools are utilized to perform the delivery process. Processing may be shared by the user system 202 and the host system 204 by providing an application (e.g., java applet) to the user system 202. Alternatively, the user system 202 can include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

FIG. 3 is an exemplary structured vehicle diagnostic record format. The exemplary structured vehicle diagnostic record format includes an attribute for a structured-record number 310. Also included in the structured vehicle diagnostic record format is a set of vehicle-description attributes 320. As depicted in FIG. 3, the vehicle-description attributes 320 include: VIN (vehicle identification number); VEH YR (vehicle year); VEH LINE (vehicle line, e.g., J Platform for cars and S/T Trucks (2WD and 4WD small trucks and Sport Utility Vehicles)); VIN MODEL (e.g., Name); VIN MAKE (e.g., Division); VIN SERIES (e.g., Limited, Custom); VIN BODY (e.g., two door sedan, four door all purpose vehicle); VIN ENGINE (displacement, configuration, and fuel system; e.g., 4.0 liter V8 Sequential Fuel Injection, 1.8 liter inline 4 cylinder Sequential Fuel Injection); VIN YR (vehicle year code); VIN PLANT (plant where vehicle was manufactured); VIN SERIAL (serial number of vehicle); and MILEAGE The structured vehicle diagnostic record format depicted in FIG. 3 also includes a set of bookkeeping attributes 330. The bookkeeping attributes 330 include information about who entered the service record data and the status of the structured record. The bookkeeping attributes 330 include: DATE AUTHORED; DATE EDITED; AUTHOR/EDITOR; BULLETINS (bulletins related to the structured record); RECORD NUMBER (the sequence number of the source record utilized to create this structured record); STRUCTURED-RECORD STATUS (e.g., is the structured record released or unreleased); RELEASE AUTHORIZER; and LANGUAGE (e.g., English, German). An exemplary structured vehicle diagnostic record format also includes a set of system attributes 340. The system attributes 340 contain information about the category of service described in the structured vehicle diagnostic record format. The system attributes 340 include: SERVICE CATEGORY TYPE (the applicable service manual section, e.g., transmission); SERVICE CATEGORY (the applicable service manual subsection (e.g., automatic, manual); and SERVICE SUBCATEGORY (identifies additional description of the service category, e.g., engine or transmission numbers such as 4T65-E, 4L80-E, NV3500, ZF56-650).

Also depicted in FIG. 3 are a set of symptom attributes 350. The first symptom attribute 350 in FIG. 3 is the MAIN SYMPTOM GROUP. The MAIN SYMPTOM GROUP attribute includes the service technician's classification of the symptoms, such as: air leak, abnormal operation, concerns with fluids, indicator inoperative, indicator on, inoperative, noise, odor, unwanted operation or vibration.

The SYMPTOM GROUP attribute may include data that reflects symptoms more specifically, e.g., air bag indicator on, engine has burning odor. Additional symptom attributes 350 include: SYMPTOM (the symptom, or customer complaint); SYMPTOM DETAIL (adds to the symptom description, e.g., if SYMPTOM is noise, then SYMPTOM DETAIL might describe the type of noise); FUNCTIONAL COMPONENT/SYSTEM (which part of the vehicle is experiencing/causing the condition described by the MAIN SYMPTOM GROUP); FUNCTIONAL COMPONENT/SYSYSTEM DETAIL (additional information about the FUNCTIONAL COMPONENT/SYSTEM); FREQUENCY (frequency with which the symptom is observed or experienced; e.g., intermittent, flashes); ENVIRONMENT CONDITION (describes the condition of the environment at the time the symptom is observed; e.g., raining, 95 degrees F.); and VEHICLE CONDITION (describes the operating conditions of the vehicle at the time the symptom is observed; e.g., just after starting, under load). Further symptom attributes 350 may include: VEHICLE ZONE (specific information that adds to the information already provided about the symptom, e.g., top, bottom, right-hand side); DTC (diagnostic trouble code, automatically generated by the electronics of the vehicle); DTC QUALIFIER (describes the status of the DTC, e.g., current, history, null, current and history); and ADDITIONAL SYMPTOM COMMENTS.

The structured vehicle diagnostic record format depicted in FIG. 3 also includes a set of action attributes 360. The action attributes 360 include information about what service was performed in response to the service request or symptoms that generated the source record. The action attributes 360 include: ACTION TAKEN (the repair action taken); COMPONENT NAME; COMPONENT LOCATION (the location of the component being acted upon); COMPONENT PIECE OF (free-text that defines the piece of the component being acted upon); COMPONENT DETAIL (free-text that defines the component being acted upon in detail); LABOR OPS (labor operation codes); and ADDITIONAL ACTION COMMENTS.

FIG. 4 is an exemplary case record format for case records stored in the case database 106. As part of the release process 104, a case record is created from a structured vehicle diagnostic record 102. When the new case record is created, it is not yet released. Then, it is reviewed and either released, retained for editing or for additional information, or deleted. The exemplary case-record format includes a case-record number attribute 410. Also included in the case-record format is a set of vehicle description attributes 420. In the exemplary embodiment depicted in FIG. 4, the case record vehicle description attributes 420 are the same as the structured vehicle diagnostic record vehicle description attributes 320. The case-record format depicted in FIG. 4 also includes a set of bookkeeping attributes 430. The bookkeeping attributes 430 include information about who entered the service record data and the status of the case record. The bookkeeping attributes 430 include: DATE AUTHORED (i.e., the date the case was authored); DATE EDITED (i.e., the date the case was last edited); AUTHOR/EDITOR; BULLETINS (official service bulletins related to the case record); RECORD NUMBER (the sequence number of the source record utilized to create this case); CASE-RECORD STATUS (e.g., is the case record released or unreleased); RELEASE AUTHORIZER; LANGUAGE (e.g., English, German); STRUCTURED-RECORD NUMBER (associated structured vehicle diagnostic record or records used to create this case); and NUMBER OF STRUCTURED RECORDS (effectively, the number of repair events summarized by this case). In the exemplary embodiment depicted in FIG. 4, the case record bookkeeping attributes 430 are the same as the structured vehicle diagnostic record bookkeeping attributes 330 with the exception of the substitution of CASE-RECORD STATUS for STRUCTURED-RECORD STATUS and the addition of the STRUCTURED-RECORD NUMBER and NUMBER OF STRUCTURED RECORDS attributes.

An exemplary case-record format also includes a set of system attributes 440. In the exemplary embodiment depicted in FIG. 4, the case record system attributes 440 are the same as the structured vehicle diagnostic record system attributes 320. Also depicted in FIG. 4 is a set of symptom attributes 450. The symptom attributes 450 depicted in FIG. 4 are the same as the structured vehicle diagnostic record symptom attributes 350. Also included in FIG. 4 is a set of action attributes 460. In the exemplary embodiment depicted in FIG. 4, the case record action attributes 460 are the same as the structured vehicle diagnostic record action attributes 360.

The case-record format depicted in FIG. 4 also includes a set of feedback attributes 470. The feedback attributes 470 include information about the usefulness of the case. The feedback attributes 470 include: CASE USEFUL COUNTER (number of technicians that have indicated that the case helped to repair the vehicle); CASE NOT USEFUL COUNTER (number of technicians that have indicated the case information did not help to repair the vehicle); CASE CORRECT COUNTER (number of technicians that have indicated the case information was correct for the vehicle); CASE NOT CORRECT COUNTER (number of technicians that have indicated that the case information was not correct for the vehicle); CASE USEFUL AND CORRECT COUNTER (the number of times the CASE USEFUL and the CASE CORRECT counters were incremented in the same session); NUMBER OF TIMES CASE VIEWED; and FEEDBACK TEXT (free text). The case-record format also includes a set of case summary attributes 480 including: TITLE (descriptive title for the case); CASE SUMMARY (free text); and FINAL COMMENTS (free text). Additionally, the case record format depicted in FIG. 4 includes an OTHER DOCUMENTATION attribute 490 to attach (e.g., through a computer link) any relevant documentation to assist in the repair.

An embodiment of the present invention delivers vehicle diagnostic knowledge, in the form of case records, to vehicle service technicians. The case records are created from field repair records created by service technicians. The ability to access a database of case records may lead to faster and more consistent diagnoses and repairs in the field. Faster and more consistent repairs may result in cost savings because the action required is more easily determined and therefore takes less time. From a quality viewpoint, the ability to perform repairs more quickly and consistently improves the overall quality of service diagnostics. The ability to incorporate user feedback also improves the overall quality of service, because cases that are not useful are corrected or eliminated while new cases that incorporate new knowledge can be added. These quality improvements may also lead to greater customer satisfaction because customer vehicles will be more likely to be repaired quickly and correctly. From the service-technician viewpoint, an embodiment of the present invention may allow the service technician to avoid the use of complex and time-consuming diagnostic trees and time-consuming calls to the TAC. The knowledge in the case database 106 will be updated on a continuous basis via technician feedback. This may lead to the case database 106 being more up-to-date when compared to rules-based expert systems and other systems with a fixed knowledge base.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. An embodiment of the present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for vehicle diagnostic knowledge delivery, said method comprising:
   receiving a search request from a user system;
   accessing a database of case records indicative of field repair records created by service technicians for a plurality of vehicles in response to said search request, wherein each said case record includes a case-record number attribute, a set of vehicle-description attributes, a set of bookkeeping attributes, a set of system attributes, a set of symptom attributes and a set of action attributes;
   searching said database of case records for a case record responsive to said search request; and
   transmitting said case record responsive to said search request to said user system if said searching results in locating said case record responsive to said search request.

2. The method of claim 1 further including:
   receiving a structured vehicle diagnostic record;
   evaluating said structured vehicle diagnostic record for inclusion in said database of case records;
   creating a new case record corresponding to said structured vehicle diagnostic record if said evaluating results in a determination that said structured vehicle diagnostic record should be included in said database of case records; and
   storing said new case record in said case database.

3. The method of claim 2 wherein said evaluating is performed by a subject matter expert.

4. The method of claim 2 wherein said evaluating is automated.

5. The method of claim 2 wherein:
   each said case record further includes a set of feedback attributes, a set of case summary attributes and an other-documentation attribute; and
   creating said new case record includes adding a said set of feedback attributes, a said set of case summary attributes and a said other-documentation attribute to said structured vehicle diagnostic record.

6. The method of claim 1 further including:
   receiving feedback about said case record from said user system;
   evaluating said feedback; and
   updating said case database in response to said evaluating.

7. The method of claim 6 wherein said updating includes removing said case record from said case database.

8. The method of claim 6 wherein said updating includes updating said case records.

9. The method of claim 1 wherein said set of vehicle-description attributes includes a vehicle identification number attribute, a vehicle year attribute, a vehicle line attribute, a vehicle identification number model attribute, a vehicle identification number make attribute, a vehicle identification number series attribute, a vehicle identification number body attribute, a vehicle identification number engine attribute, a vehicle identification number year attribute, a vehicle identification number plant attribute, a vehicle identification number serial attribute and a mileage attribute.

10. The method of claim 1 wherein said set of vehicle-description attributes includes:
    a vehicle identification number attribute and a mileage attribute; or
    an attribute derivable from said vehicle identification number and said mileage attribute.

11. The method of claim 1 wherein said set of bookkeeping attributes includes a date authored attribute, a date edited attribute, an author/editor attribute, a bulletins attribute, a record number attribute, a case-record status attribute, a release authorizer attribute, a language attribute, a structured-record number attribute, and a number of structured-records attribute.

12. The method of claim 1 wherein said set of bookkeeping attributes includes at least one of a date authored attribute, a date edited attribute, an author/editor attribute, a bulletins attribute, a record number attribute, a case-record status attribute, a release authorizer attribute, a language attribute, a structured-record number attribute, and a number of structured-records attribute.

13. The method of claim 1 wherein said set of system attributes includes:
    a service category type attribute; or
    said service category type attribute and a service category attribute; or
    said service category type attribute, said service category attribute and a service sub-category attribute.

14. The method of claim 1 wherein said set of symptom attributes includes a main symptom group attribute, a symptom attribute, a symptom detail attribute, a functional component/system attribute, a functional component/system detail attribute, a frequency attribute, an environment condition attribute, a vehicle condition attribute, a vehicle zone attribute, a diagnostic trouble code attribute, a diagnostic trouble code qualifier attribute and an additional symptom comments attribute.

15. The method of claim 1 wherein said set of symptom attributes includes a main symptom group attribute, a functional component/system attribute and a diagnostic trouble code attribute.

16. The method of claim 15 wherein said set of symptom attributes further includes at least one of a symptom attribute, a frequency attribute, an environment condition attribute, and a vehicle condition attribute.

17. The method of claim 1 wherein said set of action attributes includes an action taken attribute, a component name attribute, a component location attribute, a component piece of attribute, a component detail attribute, a labor operations attribute and an additional action comments attribute.

18. The method of claim 1 wherein said set of action attributes includes an action taken attribute and a component name attribute.

19. The method of claim 1 wherein each said case record further includes a set of feedback attributes.

20. The method of claim 19 wherein said set of feedback attributes includes a case useful counter attribute, a case correct counter attribute, and a feedback text attribute.

21. The method of claim 19 wherein said set of feedback attributes includes a feedback text attribute.

22. The method of claim 19 further comprising:
receiving feedback about said case record from said user system, wherein said feedback is included in said case record in said set of feedback attributes;
evaluating said feedback; and
updating said case database in response to said evaluating.

23. The method of claim 1 wherein each said case record further includes a set of case summary attributes and an other-documentation attribute.

24. The method of claim 23 wherein said set of case summary attributes includes a title attribute.

25. The method of claim 23 wherein said set of case summary attributes includes a title attribute and a case summary attribute.

26. A system for vehicle diagnostic knowledge delivery, the system comprising:
a network;
a storage device in communication with said network; and
a host system in communication with said network, said host system including application software to implement a method comprising:
receiving a search request from a user system;
accessing a database of case records indicative of field repair records created by service technicians for a plurality of vehicles and located on said storage device in response to said search request, wherein each said case record includes a case-record number attribute, a set of vehicle-description attributes, a set of bookkeeping attributes, a set of system attributes, a set of symptom attributes and a set of action attributes;
searching said database of case records for a case record responsive to said search request; and
transmitting said case record responsive to said search request to said user system if said searching results in locating said case record responsive to said search request.

27. The system of claim 26 wherein said database of case records is a relational database.

28. A computer program product for vehicle diagnostic knowledge delivery, the computer program product comprising:
a storage medium readable by a processing circuit and storing instructions for execution by the processing circuit for performing a method comprising:
receiving a search request from a user system;
accessing a database of case records indicative of field repair records created by service technicians for a plurality of vehicles in response to said search request, wherein each said case record includes a case-record number attribute, a set of vehicle-description attributes, a set of bookkeeping attributes, a set of system attributes, a set of symptom attributes and a set of action attributes;
searching said database of case records for a case record responsive to said search request; and
transmitting said case record responsive to said search request to said user system if said searching results in locating said case record responsive to said search request.

29. A case-record format for vehicle diagnostic knowledge delivery, said format comprising:
a case-record number attribute;
a set of vehicle-description attributes;
a set of bookkeeping attributes;
a set of system attributes;
a set of symptom attributes; and
a set of action attributes.

30. The format of claim 29 wherein:
said set of vehicle-description attributes includes attributes for vehicle identification number and mileage;
said set of bookkeeping attributes includes an attribute for date authored;
said set of system attributes includes attributes for service category type, service category and service sub-category;
said set of symptom attributes includes attributes for main symptom group, symptom, functional component/system, frequency, environment condition, vehicle condition and diagnostic trouble code; and
said set of action attributes includes attributes for action taken and component name.

31. The case-record format of claim 29 wherein said format further comprises:
a set of feedback attributes.

32. The case-record format of claim 31 wherein said set of feedback attributes includes a case useful counter attribute, a case correct counter attribute, and a feedback text attribute.

33. The case-record format of claim 29 wherein said format further comprises:
a set of case summary attributes; and
an other-documentation attribute.

34. The case-record format of claim 33 wherein said set of case summary attributes includes a title attribute.

* * * * *